(12) United States Patent
Cronin (10) Patent No.: US 9,420,477 B2
(45) Date of Patent: Aug. 16, 2016

(54) SIGNAL STRENGTH MANAGEMENT

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

(21) Appl. No.: 14/622,511

(22) Filed: Feb. 13, 2015

(65) Prior Publication Data

US 2015/0358834 A1    Dec. 10, 2015

Related U.S. Application Data

(60) Provisional application No. 62/007,761, filed on Jun. 4, 2014.

(51) Int. Cl.
| | |
|---|---|
| *H04W 24/02* | (2009.01) |
| *H04W 36/00* | (2009.01) |
| *H04W 64/00* | (2009.01) |
| *H04W 36/14* | (2009.01) |

(52) U.S. Cl.
CPC .......... *H04W 24/02* (2013.01); *H04W 36/0011* (2013.01); *H04W 64/006* (2013.01); *H04W 36/14* (2013.01)

(58) Field of Classification Search
CPC ................................. H04W 64/00; H04W 4/02
USPC ....................................................... 455/452.1
See application file for complete search history.

(56) References Cited

U.S. PATENT DOCUMENTS

| | | | |
|---|---|---|---|
| 6,721,572 B1 * | 4/2004 | Smith et al. ................ | 455/456.1 |
| 8,484,728 B2 | 7/2013 | De Atley | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |

(Continued)

FOREIGN PATENT DOCUMENTS

| | | |
|---|---|---|
| WO | PCT/US2015/033350 | 5/2015 |
| WO | WO 2015/187501 | 12/2015 |

OTHER PUBLICATIONS

Jackson, William, "App would give 911 operators control of callers' smart phones", GCN Technology, Tools and Tactics for Public Sector IT, Jun. 12, 2013.

(Continued)

*Primary Examiner* — Matthew Sams
(74) *Attorney, Agent, or Firm* — Polsinelli LLP (57) ABSTRACT

Methods and systems for signal strength management are provided. A first (mobile) communication device may provide a server with information relating to the signal strength, and such information may be used to determine future signal strength (e.g., at a different location). The first user may see the signal strength of a second communication device with which it may be communicating. The communication device may also communicate with a system that maintains a real-time database of signal strengths throughout an area, such as a state. A user's handheld device may receive a indications, warnings, and recommended courses of action that the user may take to maintain communications when a signal strength of a wireless communication network is predicted to change. Users of the present invention may take actions to insure that the quality of their call is maintained.

20 Claims, 9 Drawing Sheets

(56) References Cited

U.S. PATENT DOCUMENTS

| | | | |
|---|---|---|---|
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 2003/0108009 A1 | 6/2003 | Petersen | |
| 2005/0270236 A1 | 12/2005 | Krumm et al. | |
| 2007/0274488 A1* | 11/2007 | Callaghan | 379/201.01 |
| 2009/0168736 A1* | 7/2009 | Itagaki et al. | 370/338 |
| 2009/0248292 A1* | 10/2009 | Adachi et al. | 701/201 |
| 2011/0184880 A1* | 7/2011 | Neumann | G06Q 30/06 705/344 |
| 2011/0319043 A1 | 12/2011 | Jackson et al. | |
| 2013/0003951 A1* | 1/2013 | Pitschel et al. | 379/93.13 |
| 2013/0090130 A1* | 4/2013 | Burrell et al. | 455/456.1 |
| 2013/0120591 A1 | 5/2013 | Bednarczyk | |
| 2013/0155842 A1* | 6/2013 | Moore et al. | 370/221 |
| 2013/0159552 A1* | 6/2013 | Xiang et al. | 709/246 |
| 2013/0189995 A1 | 7/2013 | Wormald | |
| 2013/0303192 A1 | 11/2013 | Louboutin | |
| 2013/0317835 A1 | 11/2013 | Mathew | |
| 2013/0328917 A1 | 12/2013 | Zambetti et al. | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2014/0018111 A1* | 1/2014 | Farley et al. | 455/456.6 |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0126411 A1 | 5/2014 | Bugenhagen | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |

OTHER PUBLICATIONS

"Taking Pictures Just Got Easier with Droid's New User Interface", https://insidersguide.vzw.com/tech-smarts/new-droid-camera-ui, Jan. 8, 2014.

PCT Application No. PCT/US2015033350 International Search Report and Written Opinion mailed Aug. 26, 2015.

* cited by examiner

| User ID | Location Longitude | Location Lattitude | Time | Speed | Signal Strength |
|---|---|---|---|---|---|
| 802 444 5111 | 41 24' 32" N | 73 12' 45" W | 10:15 | 0 | Good |
| 802 444 5111 | 41 28' 30" N | 73 12' 29" W | 10:21 | 60mph | Fair |
| 802 444 5111 | 41 33' 22" N | 73 12' 56" W | 10:42 | 61 mph | Poor |
| ... | | | | | |
| 617 222 1515 | 41 20' 30" N | 71 11' 14" W | 10:15 | 0 | Good |
| 617 222 1515 | 41 20' 30" N | 71 11' 14" W | 10:42 | 0 | Good |

610

| User ID | Cell Data | Enable Signal Strength | Enable Auto Signal Strength | Apps | Other |
|---|---|---|---|---|---|
| 802 444 5111 | On | Yes | Yes | FaceTime | ... |
| ... | | | | SIRI | ... |
| 617 222 1515 | On | Yes | Yes | | ... |
| ... | | | | | |

SIGNAL STRENGTH MANAGEMENT

CROSS-REFERENCE TO RELATED APPLICATIONS

The present application claims the priority benefit of U.S. provisional application No. 62/007,761 filed Jun. 4, 2014 and entitled "Single Strength Management," the disclosure of which is incorporated herein by reference.

BACKGROUND OF THE INVENTION

1. Field of the Invention

The present invention relates generally to the field of wireless communication regarding cellular signal strength of handheld devices.

2. Description of the Related Art

It is well-known that wireless communication devices (e.g., "handheld devices" or "mobile devices") rely on wireless signals of a minimum strength in order to effectively communicate with the cellular network. Signal strength received at a handheld device may be variable and impact phone conversations when it dips below a minimum threshold, resulting in either dropped calls or inaudibility of the call. However, while the user of a handheld device knows the signal strength of their own phone, the user may not know the signal strength of their conversation partner. Signal strength is not currently integrated with iOS, and solutions for fixing weak signal strength do not currently exist. This means that if a caller loses signal, he must accept that he has to end the call regardless of his desire or the call's importance. Moreover, signal strength management systems are not currently available. Presently, callers can see their own signal strength, and they may access historical maps of carrier coverage to obtain a rough idea of where there is good signal and where there are dead spots. In addition, boosters can also be used to increase signal strength in certain areas. Another option for low-signal strength areas is to call using voice over IP on a Wi-Fi connection.

In addition, cell strength can change by time of day and by weather and also can change due to telecommunications assets in repair. The user constantly experiences the cellular reception strength in real-time, but that is not communicated to anyone else for use. This is rich data that can be useful by many systems and entities, not the least the telecommunications systems itself.

There is, therefore, a need in the art for improved systems and methods for signal strength management.

SUMMARY OF THE CLAIMED INVENTION

Embodiments of the present invention include a method and system for measuring cellular signal strength data and using it to alert handheld device users when they may lose adequate signal strength during operation. The method and system may also provide users with various options or selections to prevent interrupting an operation, such as dropping their phone call.

Methods of signal strength management may include receiving a measure of signal strength from a first of electronic communication device, wherein the measure of signal strength is the current measured signal strength received by the first electronic communication device. Methods may further include determining the current location of the first electronic communication device, determining a velocity of the first electronic communication device, determining a path of travel along which the first electronic communication device is traveling when the velocity of the electronic communication device is greater than zero, accessing a database, wherein the database stores the signal strength at a plurality of different locations, forecasting that the signal strength received by the first electronic communication device will likely reduce in the future, wherein the reduced signal strength is forecasted using the current location, the velocity, the path of travel, and the database, and transmitting the reduced signal strength forecast to the first electronic communication device.

Exemplary suggestions that may be provided to a user of a handheld device may include, yet are not limited to, recommending that the user complete the call before a measure of time corresponding to the time of the forecasted future reduction of signal strength, a change in the path of travel that is predicted to maintain a signal strength that is greater than the forecasted signal strength, switching a call from a cellular network to a Wi-Fi network. Users of a handheld device may select any particular action corresponding to the aforementioned suggestions, or to other suggestions that may be provided to the user.

In certain circumstances, a handheld device consistent with the invention may perform a method using the following steps: Initiating a call on a first electronic communication device, wherein the call is to a second electronic communication device, and transmitting an indication of signal strength to the second electronic communication device, wherein the indication of signal strength transmitted corresponds to a currently measured signal strength received by the first electronic communication device.

Apparatuses and non-transitory computer-readable storage media for signal strength management may also be included in embodiments of the present invention. Such apparatuses and computer-readable storage media may involve implementing methods for signal strength management as described herein.

DETAILED DESCRIPTION

Embodiments of the present invention provide for methods and systems of signal strength management. A measure of signal strength may be received from a first of electronic communication device indicating the current measured signal strength received by the first electronic communication device. The current location, velocity, and path of travel of the first electronic communication device may be determined. A database may be accessed to determine what signal strength may be associated with a plurality of different locations. A forecast may be made that the signal strength received by the first electronic communication device will likely reduce in the future based on the determined location, velocity, path of travel, and the database. The forecast may be transmitted to the first electronic communication device.

Figure 1:
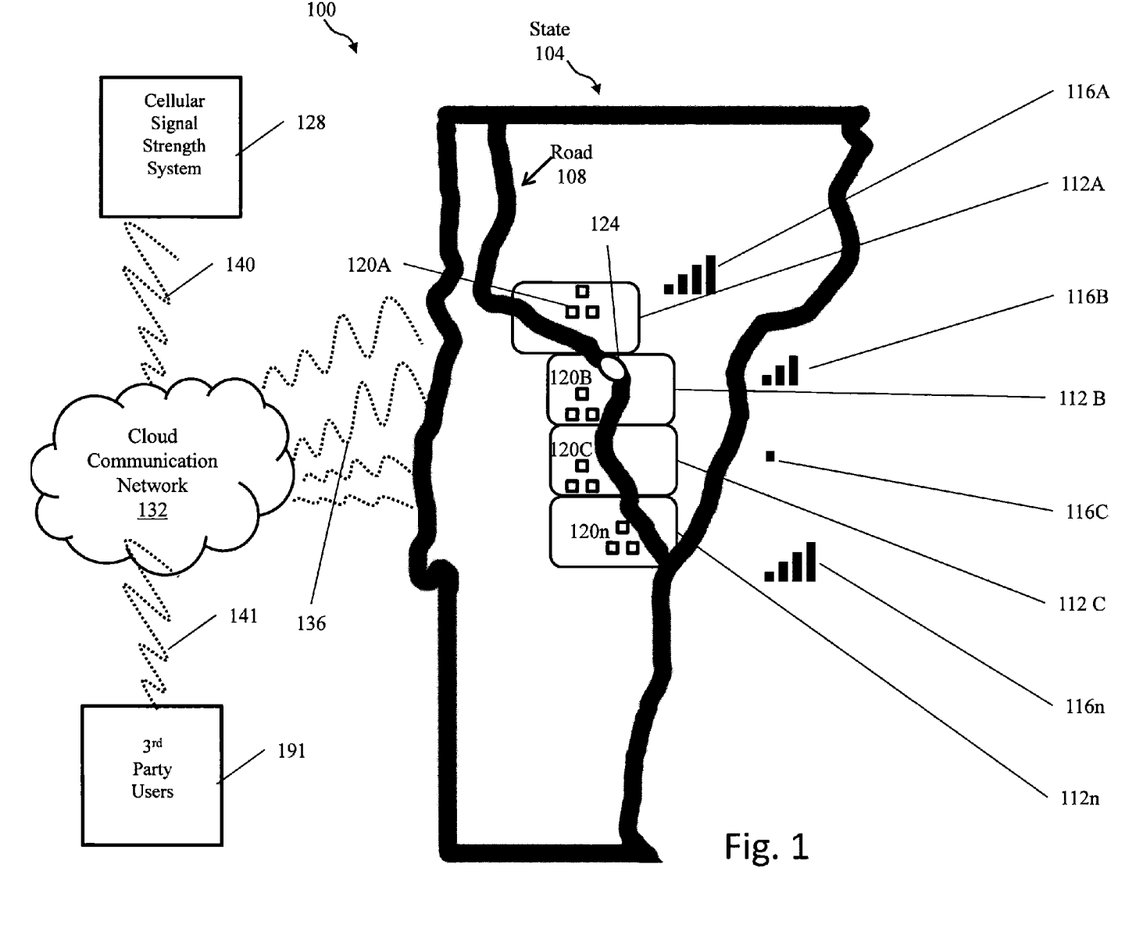
FIG. 1 illustrates a network environment in which a system for signal strength management may be implemented.

FIG. 1 illustrates a network environment 100 in which a system for signal strength management may be implemented. Geographic location 104 (e.g., the state of Vermont in the United States) may be any defined area, including state, province, country, or municipality, and portions thereof.

Road 108 (e.g., driving paths, train/subway tracks, walkways) may be any type of travel path along which users may travel. Typically, individuals have access to, and are capable of using a cellular device while within the boundaries of the road. An example of such a road 108 is Interstate 89 (I-89) in the state 104 of Vermont U.S.A.

Signal regions 112A-112C may be any area through which vehicles and cellular users pass or reside. This area may encompasses a portion of road 108 and territory substantially adjacent to the road, the size and limitations of which may be defined and determined according to methods known in the art. Signal region 112A may include a set of discrete users that access cellular services through wireless signals of a certain average strength. Signal region 112A may also contain other devices able to access the internet via wireless "Wi-Fi" signals, wired connections, and wireless access to adjacent signal regions. As illustrated, signal region 112A may be a segment of I-89 and adjacent territory between White River Junction and Royalton, Vt.; signal region 112B may be another segment of I-89 adjacent territory between Royalton and Brookfield, Vt.; and signal region 112C may be yet another segment of I-89 and adjacent territory between Brookfield and Montpelier, Vt. Further segments and adjacent territory may be further defined (e.g., signal region 112n).

Signal strength 116A-n as respectively determined in signal regions 112A-n may be a measurement of the strength of cellular service, which may be represented as a number of 'bars' from 1 to 5 on a communication device. Stronger signal strength allows for better reception, faster cellular data transfer, and increased phone call clarity (e.g., 4 bars vis-à-vis 1 bar).

Cellular users 120A-n in respective signal regions 112A-n may be cellular users resident or otherwise located within signal region 112A who report signal strength 116A to a central database (e.g., at cellular signal strength system 128). either directly or by directing their mobile devices to automatically report the signal strength 112A.

Signal strength user 124 may be a cellular user who is travelling along road 108 through state 104 and is travelling through multiple signal regions during use of a communication device. As the user is travelling, signal strength may change, and as such, it may be useful to learn how such signal strength will change, as well as recommendations for maintaining a minimum signal strength during the call.

Cellular signal strength system 128 may include a database that holds signal strength information and associated data collected from multiple communication devices 120A-n throughout the signal regions 112A-n. Such a database may be an array of disk drives, other electronic memory devices, a set of devices, or other memory devices commonly known in the art.

Cloud communication network 132 may be any global system of interconnected computer networks that use the standard internet protocol suite (TCP/IP) to serve several billion users worldwide. It may be a network of networks that consists of millions of private, public, academic, business, and government networks from local to global scope, that are linked by a broad array of electronic, wireless, and optical networking technologies and may be, for example the Internet.

Cellular data links 136 may be any open channel used to transmit data to cloud communication network 132. Their purpose is to transmit signal strength data 112A-112n from cellular users 120A-112n to cloud communication network 132 and may be, for example, wireless "Wi-Fi" signals, wired connections, and other data links, such as are commonly known in the art. Cloud data link 140 may be one or more data links between cloud communication network 132 and cellular strength database 128 through which data is transmitted. Such cloud data links may include a data trunk, a fiber optic line, or any data link that is commonly known in the art.

3rd party users 191 may include any individual or entity that may be allowed access to the data in cellular strength system 128. Such 3rd party may be a telecommunications system company, an application developer, device manufacturers, etc., that may find information regarding signal strength useful.

Data link 141 may include one or more data links between cloud communication network 132 and 3rd party users 191 through which data is transmitted. Such data links may include a data trunk, a fiber optic line, or any type of data link known in the art.

As illustrated, regions 112A-n may be located contiguously along road 108 upon which user 124 is travelling. In each region, the mobile devices within may detect the signal strength of their respective regions (e.g., signal strengths 116A-116n) and transmit that information to cloud communication network 132 via cellular data links 136. Cloud communication network 132, in turn, transmits the signal strength data to cellular signal strength system 128 via cloud data link 140. Cellular signal strength system 128 may then, after analysis, transmit data via cloud data link 140 through cloud communication network 132 and cellular data link 136 to user 124. As such, the user may be apprised of the signal strength of a region into which they are about to enter. In some instances, 3rd party users 191 may be allowed access to the data in cellular strength system 128 through the data link 141 to the cloud communication network 132. In this way, 3rd party users 191 can use data from cellular strength system 128 to improve various hardware, software, and other related products and services.

Figure 2:
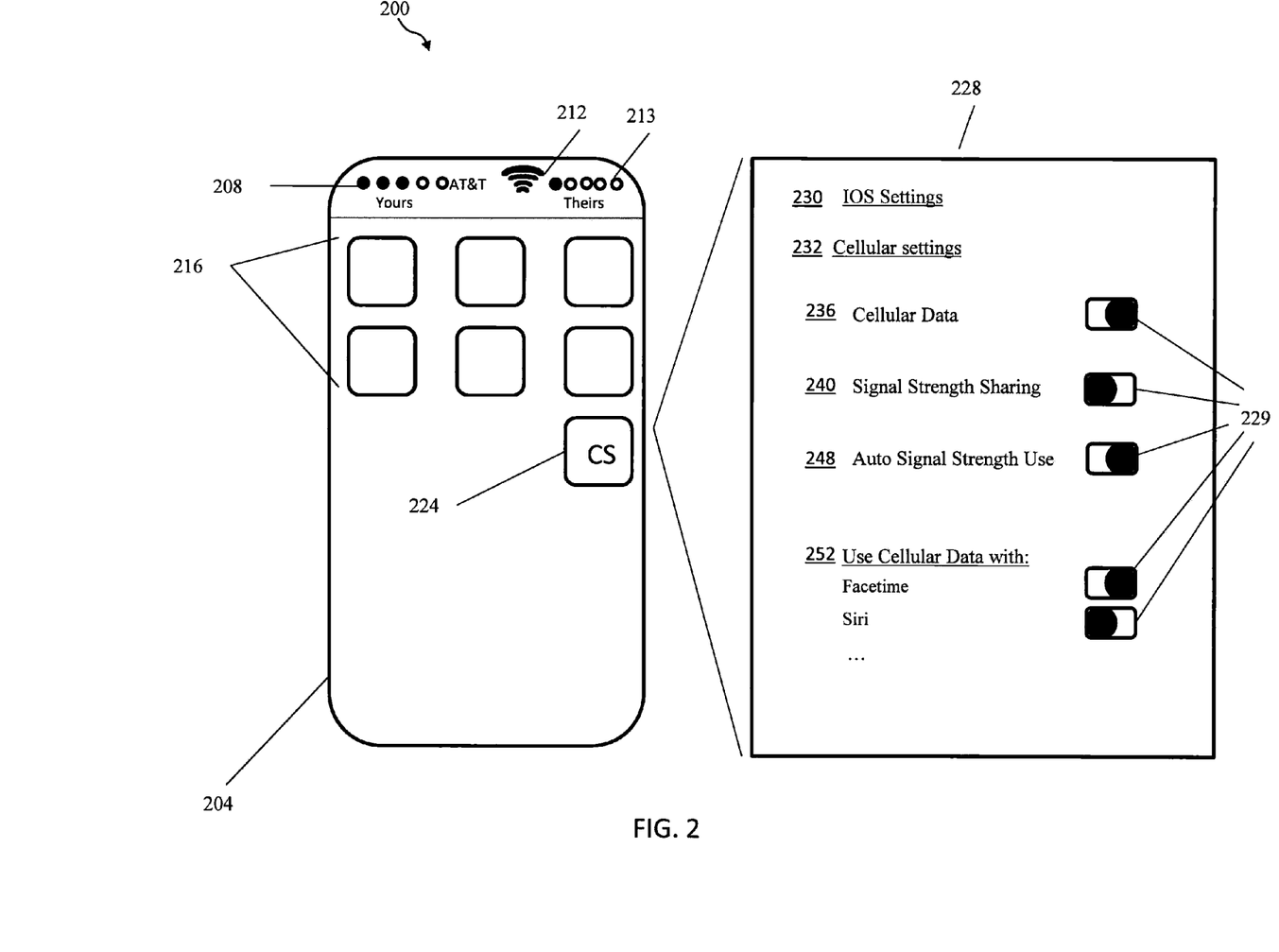
FIG. 2 illustrates an exemplary user interface of a communication device and settings thereof that may be used in a system for signal strength management.

FIG. 2 illustrates an exemplary user interface 204 of a communication device 200 and settings thereof that may be used in a system for signal strength management. Users may use any number of different electronic user devices 200, such as mobile phones, smartphones, personal digital assistants (PDAs), portable computing devices (e.g., laptop, netbook, tablets), handheld computing device, or any other type of computing device known in the art. User devices 200 may also be configured to access data from other storage media, such as memory cards or disk drives as may be appropriate in the case of downloaded services. User device 200 may include standard hardware computing components such as network and media interfaces, non-transitory computer-readable storage (memory), and processors for executing instructions that may be stored in memory. User device 200 may further be associated with a unique phone number capable of sending and receiving telephone calls, text messages, picture messages, as well as data for internet connectivity, email, and web browsing.

The device 200 in FIG. 2 shows the current signal strength in a bars signal indicator 208. Bars indicator 208 indicates that the current measured signal strength level is 3 bars out of 5. Wi-Fi service indicator 212 shown in handheld device 200 is an indicator icon on handheld device 200. This indicator shows that the strength of a Wi-Fi currently received is four out of four arcs. Typically, the Wi-Fi service indicator will show zero arcs when the Wi-Fi on handheld device 208 is turned off, or when there is no Wi-Fi signal in the vicinity of the handheld device 208.

User interface 204 further displays a plurality of software applications 216. Software applications 216 may come pre-installed on the handheld device 200, or may be purchased and installed thereon. Software applications 216 may include applications relating to text messaging, camera applications, clock applications, games, and geo-location applications.

Settings 224 is an icon that allows a user to access and change the configuration of various functions or setting in the device 200. When a user selects this button, another user interface 228 appears. In certain instances, some settings 224 may be at least partially incorporated into the operating system of device 200. In other instances, some settings 224 may further relate to software applications that may be installed on device 200.

When a plurality of 3rd party users (e.g., 3rd party 191 in FIG. 1) have signal strength settings 224 installed on their devices, those users can manage the quality of their communications in ways that help them to avoid interruptions in their communications.

User interface 228 enables the user to toggle data options on and off, including iOS settings 230, cellular settings 232, cellular data 236, signal strength sharing 240, auto signal strength use 248, and use cellular data with 252 options regarding such software applications as FaceTime™ and Siri™.

For iPhones, iOS settings 230 in FIG. 2 may include settings that control basic functionality of the iOs operating system environment. Typically, iOS settings 230 allow a user to modify settings that relate to the display, sound, and connectivity of the device 200. iOS settings 230 may also allow the user to manage the software applications 216 that are installed on handheld device 200.

When a user selects cellular settings 232, a submenu (not depicted) will typically be displayed on the handheld device 200. In certain instances, cellular settings 232 include iPhone settings, cellular data settings, data connectivity settings, or other settings that relate to controlling cellular data commonly known in the art.

Cellular data 236, signal strength sharing 240, auto signal strength use 248, and use cellular data with 252 are various features that may be enabled or disabled by a user of the handheld device 200 using toggle switches 229. When cellular data 236 is enabled, the phone will receive internet connectivity through the cellular data network, when disabled the phone will only be able to access the internet over a Wi-Fi connection. This is a way that a user can turn off cellular data while using email, or while web browsing.

Signal strength sharing 240 may be enabled within cellular settings 232, thereby allowing users to share their current signal strength with each other. Each handheld device supporting this function may display their current measured signal strength 208, as well as the signal strength 213 of another handheld device with which they are communicating.

Auto signal strength 248 may be enabled within cellular settings 232, thereby allowing signal strength measures to be used by other systems or applications within the device 200. This setting will automatically share the current signal strength with applications that wish to have access to that data. Auto signal strength 248 may allow applications as mapping applications and/or the operating system itself to use the data collected about the current signal strength of the device 200.

Cellular data selector 252 may be enabled within cellular settings 232, thereby allowing users to select which applications 216 that are allowed to use cellular data. Users also may typically be able to select which software applications 216 they wish to allow, or exclude from using cellular data. In certain embodiments, cellular data selector 252 may include a list of applications that may be selected with a check box or switch in the user interface 228.

Figure 3:
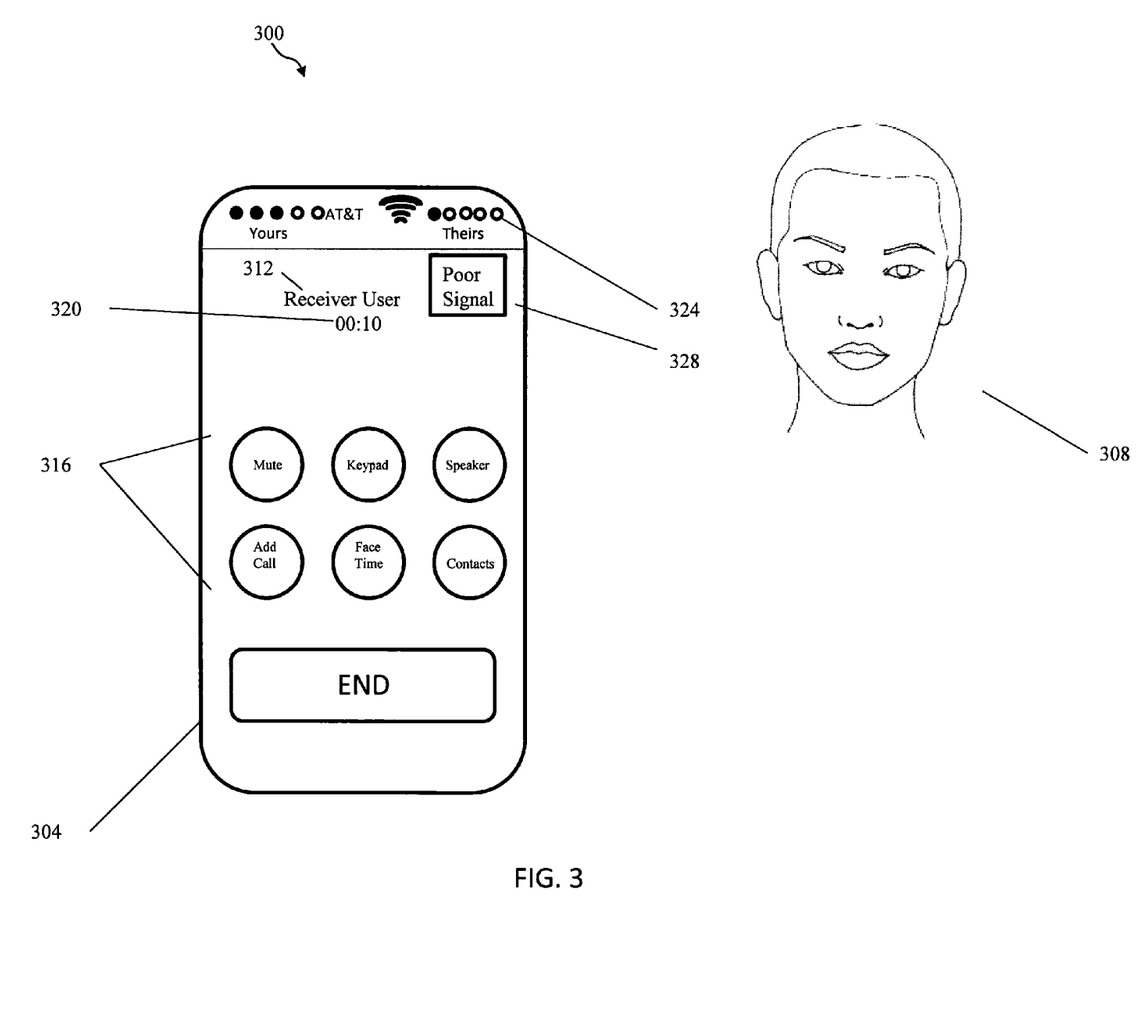
FIG. 3 illustrates an exemplary user interface display regarding signal strength management.

FIG. 3 illustrates an exemplary user interface display 304 regarding signal strength management on device 300. Such display 304 may include various types of information regarding a call, including information regarding another caller (or call recipient) 312, call options 316, call timer 320, signal strength indicator of the other caller 324, and a notification regarding the signal strength 328.

User 308 may be the operator of handheld device 300 in communication with another user (who may either be the caller or the recipient of the call) 312. The soft-selectable call options 316 buttons allow the user 308 to mute the phone, open a keypad, change speaker volume, add a call, open FaceTime™, or open a list of contacts. In certain instances, soft-selectable call options 316 buttons may be displayed on a touch screen of a smartphone. Call timer 320 is a timer that records the current length of the phone call and the duration at the end of the call. The device of the other user may send its current signal strength to device 300, which displays such information as "Theirs" 324 indicator.

Signal strength notification 328 may be any type of notification or message regarding signal strength. Typically, receiver user signal analysis 328 may include indications that the other user's signal strength is poor, fair, or good (e.g., based on the number of signal strength bars associated with the other user's phone). As illustrated, signal strength notification 328 indicates a "poor signal".

Figure 4:
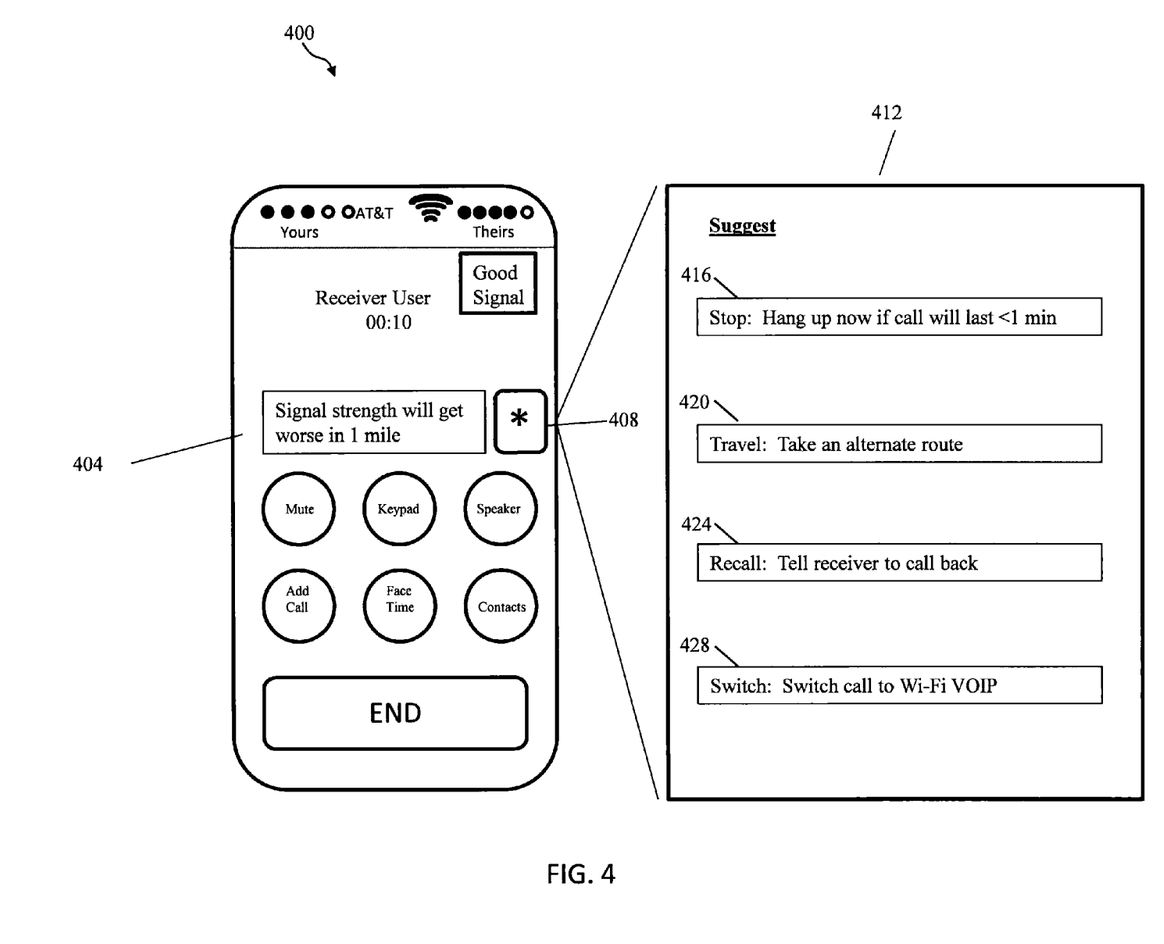
FIG. 4 illustrates another exemplary user interface display regarding signal strength management.

FIG. 4 illustrates another exemplary user interface display regarding signal strength management. Signal notification message 404 may be any type of notification or message that may be displayed during an active phone call. For example, the user may be traveling from one region to another region. Note that signal strength may significantly worsen as user moves from, inter alia, region 112B (with a signal strength of 3 bars) into region 112C (with a signal strength of 1 bar). Prior to the user entering an area with low signal strength, a notification stating "warning low signal strength ahead" can be sent to user 308. The warning message depicted in FIG. 4 states "signal strength will get worse in 1 mile." Signal notification message 404 may also be accompanied by an audible noise, a vibration, or any other such alert of which handheld device 304 is capable.

Typically, suggest button 408 in system 400 may be a soft-selection button that user 308 may select when he sees a signal notification message 404. After selection, a list of options or suggestions may be displayed. Suggestions or recommendations displayed in a user interface menu 412 may include ending the current call (e.g., Stop 416), taking an alternate route (e.g., Travel 420), telling the other user to call back later (e.g., Recall 424), or switching the call from cellular data to voice over IP using Wi-Fi (e.g., Switch 428).

Stop call function 416 is a soft-selection button that user 308 may select to end a current call before it is dropped. When this function is selected, an automatic signal may be sent to the receiver user's 312 phone indicating that user 308 will hang up in less than 1 minute. Conversely, when the current signal strength is poor but predicted to improve, this function may provide for an automatic signal to one or more other users on the call to hold as signal strength should improve shortly (e.g., within 1 minute or so).

Reroute function 420 is a user interface menu 412 soft-selection button that user 308 may press to instruct his phone to map out an alternate route for him. Typically, the alternate route may be forecasted to maintain good signal quality. This option may use a GPS application (and/or an assisted GPS application) that has the ability to provide geo-location information (e.g., directions). When this function is selected, the user may be presented with a route change when one is available. For example, there may be a number of routes toward a destination, each of which may be associated with a signal strength. One of those routes (e.g., having a good signal strength) may be suggested as an alternative route that may provide better signal strength than is currently detected along the present route.

Recall function 424 is a soft-selection button that user 308 may select. In certain instances, this will send a message to his conversation partner telling them to call back in a designated amount of time when the signal strength is forecasted to improve. This may be determined by using the velocity of the handheld device and by reviewing the signal strength in upcoming signal regions. This function may be enabled when the user enables the "enable auto signal strength use 248" (e.g., settings 230 of FIG. 2). In certain instances, the system will alert the user 308 and the other user 312 when the call is available for a redial.

Switch function 428 is a soft-selection button that user 308 may press to switch their phone call from cellular data to voice over IP using a Wi-Fi network when a Wi-Fi network of sufficient signal strength and bandwidth are available. This option will typically require a Wi-Fi signal, and a third party application enabled to make the voice over IP call. In certain instances, the call may be forwarded from a cell network to Skype™ over the Wi-Fi network. In other instances, the system may automatically engage an application like FaceTime™ when forwarding the call.

Figure 5:
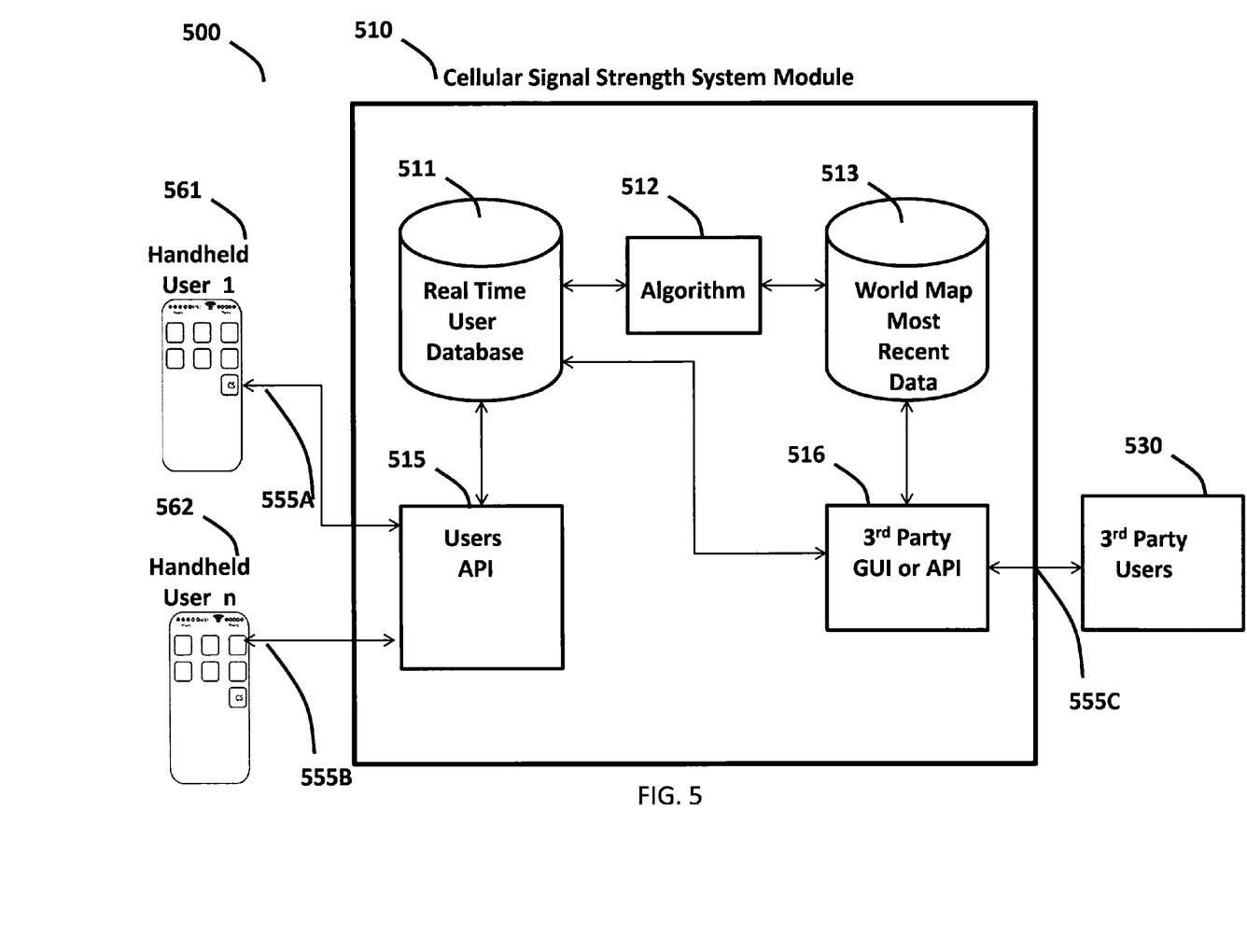
FIG. 5 illustrates an exemplary system for signal strength management.

FIG. 5 illustrates an exemplary system for signal strength management. Cellular signal strength system 500 includes the cellular signal strength system module 510 in communication with various users 561-562 and 3rd party users 530. The signal strength module 510 may include a real-time users database 511, an algorithm 512, a world map of most recent data 513, users API 515, and 3rd party GUI or API 516. Signal strength module 510 may communicate with users via connections 555A-C.

Real-time users database 511 is a database that stores data of each user. Such data may include each user's real-time location, signal strength, and Wi-Fi strength. The module 510 may also perform calculations regarding velocity and other calculations related to location, time, and signal strength. Real-time users database 511 may also store user identifications and settings that may relate to a handheld device's operating system settings (as shown in 230 of FIG. 2).

Algorithm 512 represents one or more algorithms for calculating velocity/speed based upon multiple location points and the time it took for the user's handheld device to travel between each location point to the next. Such information and results of such calculations may be sent to the real-time users database 511 for storage. Furthermore, algorithm 512 may take data from the real-time users database and update the world map most recent data 513. This allows the cellular signal strength system module 510 to obtain snapshots regarding signal strength at different time periods at different locations. The algorithm 512 may also calculate average signal strength at various particular locations using a subset of users at an instance of time. In this way, a world map of signal strength at a particular time may be assembled and stored in the real-time user database 511. Furthermore, world map of most recent data 513 may store the data from algorithms 512 at various points in time.

Users API 515 may be any application programming interface for communicating data between user devices and the cellular signal strength system module 510 (e.g., provide updated data to real-time users database 511). In some instances, the users API 515 may further allow for the backup and/or up/downloading of cellular settings (e.g., cellular settings 232 of FIG. 2).

3rd party GUI or API 516 may be any type of graphic user interface or application programming interface that allows data to be communication between 3rd party user devices and cellular signal strength system module 510. The 3rd party GUI or API 516 may also allow the backup and up/downloading of users settings (e.g., cellular settings 232 of FIG. 2). This would allow the cellular signal strength system module 510 to collect data related to 3rd party users 530 for research and/or to support 3rd party applications.

Connections 555A-C represent links between the cellular signal strength system module 510 (e.g., via cloud communication network 132 of FIG. 1) and handheld users 561-562, as well as 3rd party users 530. Such connections may be a data trunk, fiber optic line, or any data link known in the art.

In operation, cellular signal strength system module 510 communicates with handheld users 561-562, as well as with 3rd party users 530, to collect signal strength data at different times and in different locations. In certain instances, the cellular signal strength system module 510 may periodically poll a user's handheld device for data relating to signal strength and location. Algorithm 512 may be used to calculate velocity, travel path, and other metrics for each user device, which may also be recorded to real-time user database 511. Algorithm 512 may also calculate aggregated parameters, such as average signal strength for devices at one or more locations. Data in the real-time database 511 may be reviewed by a 3rd party GUI or API 516 to 3rd party through link 555C.

Figure 6:
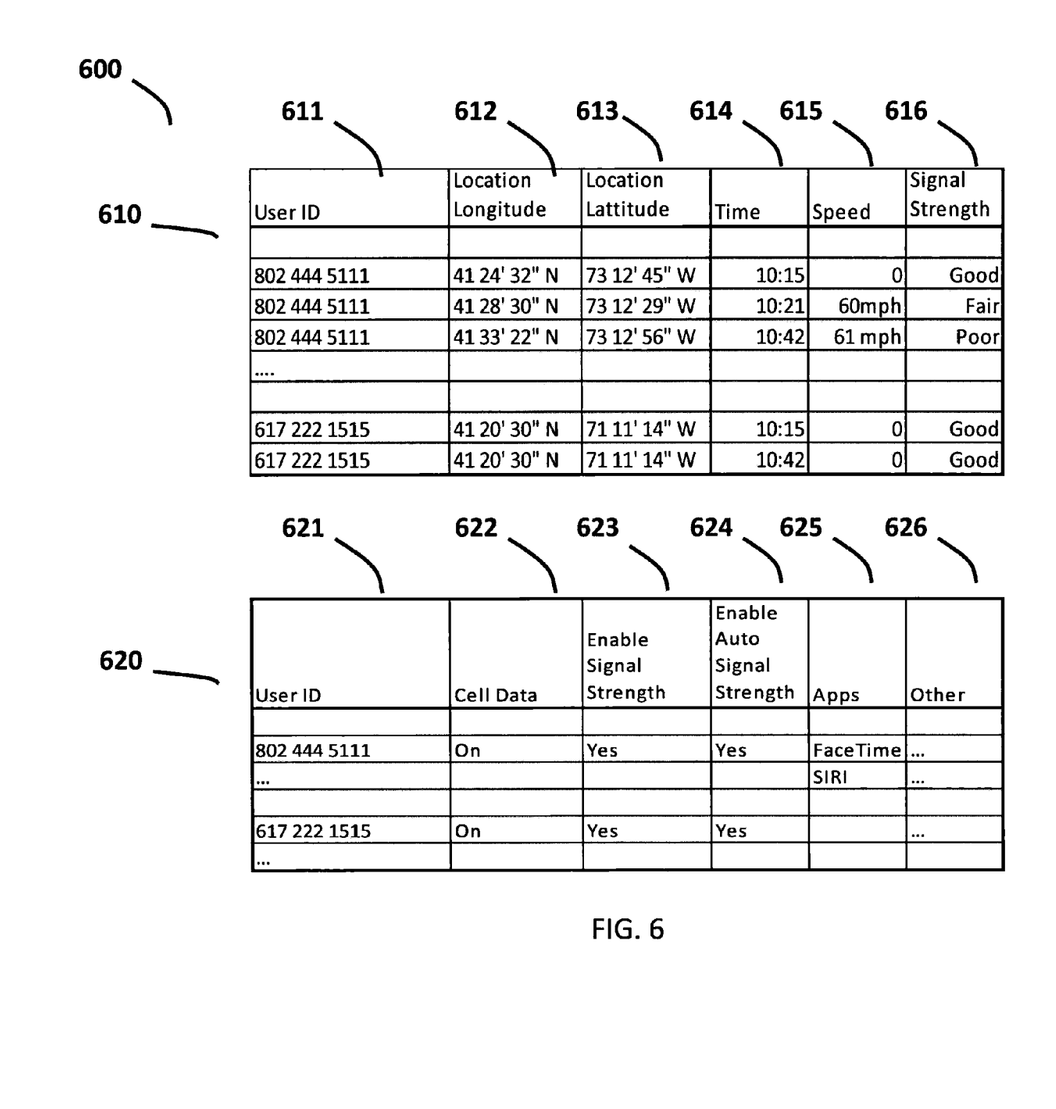
FIG. 6 illustrates an exemplary database that may be used in a system for signal strength management.

FIG. 6 illustrates an exemplary database 600 that may be used in a system for signal strength management. In table 610, information may be recorded regarding user ID 611, location longitude 612, location latitude 613, time 614, speed 615, and signal strength 616. Table 620 may further record user ID 621, whether cell data is on 622, whether the signal strength management function is enabled 623, whether auto signal strength is enabled 614, apps 625, and other 626.

Users may be alternatively be identified by their name, or another identifier instead of their phone numbers for each respective user in the user ID 611 column. Longitude location 612 and latitude location 613 identify various unique locations where particular users are at the associated time in the time column 614. The data set may also include the speed (velocity) in the speed column 615 that was calculated for the user.

In certain instances, the direction of travel of each user's handheld device may also be determined and recorded. A data set may also be used to identify the road and direction on that road that the user's handheld device is moving. Datasets will typically be stored in the real-time data base 511. Furthermore, speeds or other parameters may be calculated using algorithm 512 and the data contained in the dataset.

The various other columns in the table 620 may relate to various cellular settings 232 of user's handheld device. Cell data 622, enable signal strength 623, and enable auto signal strength 624 entries may identify which settings are enabled or disabled on the user's handheld device. Applications (Apps) 615 in the second data set may identify particular software applications used for a particular user ID 621. Other 626 in the data set may include any other settings set on a user's handheld device.

In certain instances, signal strength ranges between 100%-80% may be listed as good, signal strengths between 80%-60% may be listed as fair, signal strengths between 60%-40% may be listed as weak, and signal strengths less than 40% may be listed as poor. Alternatively, an actual signal strength measurement (e.g., number of bars) at that particular time may also be stored.

Figure 7:
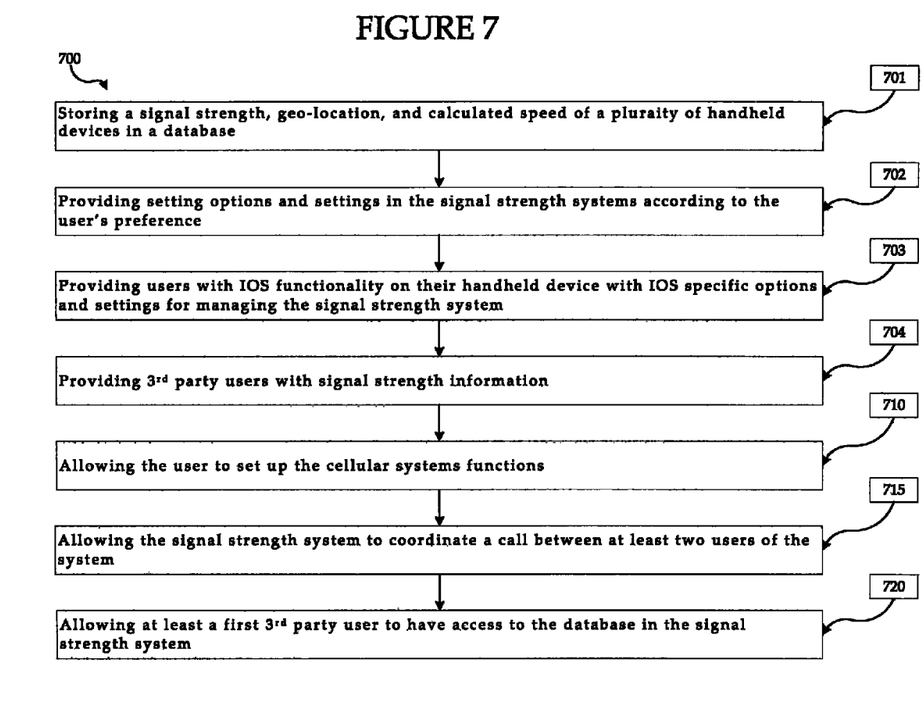
FIG. 7 is a flowchart illustrating an exemplary method for signal strength management.

FIG. 7 is a flowchart illustrating an exemplary method 700 for signal strength management. In step 701, a cellular signal strength system 510 stores a signal strength, geo-location, and calculated speed of a plurality of handheld devices in a database. Typically, the signal strength may be measured by each individual handheld device. The measure of signal strength may then be transmitted by each handheld device to signal strength system module 510. The location, velocity, path, and other characteristics of each handheld device may also be determined. Such information may be determined by each handheld device, or information allowing for such calculations may be transmitted to the signal strength system for calculation.

Alternatively, the location of a handheld device may be determined by the signal strength system using information received by each handheld device from cell towers. This information may be used to calculate the location of in the handheld device. The velocity of a handheld device may be determined by the signal strength system by calculating a change in location of the handheld device over time. Since a change in location corresponds to a distance, the system can determine the distance that a smartphone has traveled in an amount of time, thereby determining the velocity by dividing the distance by the amount of time.

Mobile station assisted GPS is an example of a system for determining the location of a handheld device. This form of assisted GPS uses snapshots of GPS data received by the handheld device that is transmitted to (and received by) a system. Such a system may use high quality GPS signals received by the system itself, compare the fragments of GPS data from the handheld device, and calculate a location. Similar location detection systems are common in the art. Frequently, these systems may use information from cell towers when determining the location of a handheld device. Alternatively, the location of a Wi-Fi hotspot received by a handheld device may be used to determine an approximate location.

In step 702, setting options and settings may be provided in the signal strength system according to the user's preference. In this step, the signal strength system provides options and settings to the user for designating preferences. Options and settings provided may include types of suggestions that the user prefers to receive from the system. For example, a user may wish to receive a recommendation relating to when it may be advisable to hang up because the signal strength received by the users handheld device is forecasted to reduce to a certain level. Other suggestions that the user may desire to receive include alternate route suggestions or recommendation regarding when to switch the call to a Wi-Fi network.

In step 703, users may be provided with iOS functionality on their handheld device for managing the signal strength system. As such, users may be provided with specific levels of functionality that take advantage of features available on the operating system of the device (e.g., different operating systems other than iOS may be used for phones other than iPhones). This step could also include providing users of other types of handheld devices with options and settings that are supported by their specific type or version of their handheld device.

In step 704, 3rd party users may be provided with signal strength information. The signal strength system may provide information relating to signal strength to users of the system. This step may include the system sending alerts to 3rd party users relating to changes in signal strength that may affect such users. This information may also include information relating to the current signal strength of particular handheld devices. Thus, this information enables a user to determine whether it may be better to call a contact using a cellular network, Wi-Fi network, or another network. This functionality also enables the user to decide whether to call a contact now or to wait to call the contact until their signal strength improves.

In step 710, the user may be allowed to set up the cellular system functions on their mobile device. As such, the user may select options and settings relating to the signal strength system. The settings and options set up in this step may be the options and settings relating to any of steps 701, 702, or 703.

In step 715, a call may be initiated between at least two users of communications devices. While the call may be initiated in accordance with methods known in the art, the cellular signal strength management system module provides each user with information regarding the other's signal strength in real-time during a call. In certain instances, the system may further provide suggestions or recommendations on how to maintain signal strength or avoid interruptions in the call.

In step 720, one or more 3rd party users may be provided access to the database of signal strength information. Information in the database may include recent signal strength information reported to the system by various users in various locations at various times. Such information may be used to derive or calculate various metrics, including velocity, path, direction, average signal strength for one or more locations over a period of time, or an entire mapping of signal strength over a given path. Thus, embodiments of the invention allow a user to plan a route that provides the best signal strength before they embark on a journey.

Figure 8:
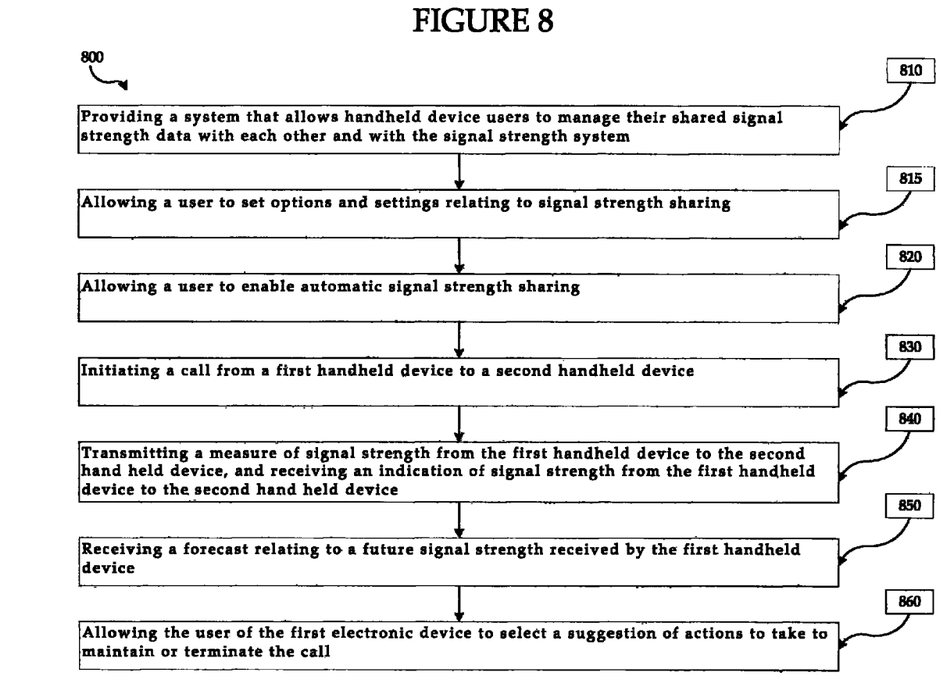
FIG. 8 is a flowchart illustrating an alternative method for signal strength management.

FIG. 8 is a flowchart illustrating an alternative method for signal strength management. In step 810, a system may be provided that allows handheld device users to manage their shared signal strength data with each other and with the signal strength system. This step is where individual users may be allowed to provide selections regarding how their respective handheld device will interact with other devices and with the signal strength system. For example, individual users may review options and settings in the operating system settings. This step may also include the providing users of other types of handheld devices with options and settings that are supported by their specific type or version of handheld device.

In step 815, a user may set options and settings relating to signal strength sharing. Thus, a user may enable, disable, or set signal strength settings to their personal preference.

In step 820, the user may choose to enable automatic signal strength sharing, which allows the handheld device to share signal strength information by default. When automatic signal strength sharing is enabled, the user's handheld device can automatically transmit and receive signal strength information with compatible handheld devices. Automatic signal strength sharing may also cause the user's handheld device to automatically transmit signal strength information to the signal strength system with it is enabled.

In step 830, a call may be connected between a first handheld device an a second handheld device. This is where a first user may speak with a second use.

In step 840, a measure of signal strength may be transmitted from the first handheld device to the second hand held device, and a corresponding indication of signal strength from the second handheld device may be received at the first handheld device. As such, the first handheld device and the second handheld device share their respective signal strengths with each other. Thus, the users of the respective devices may be made aware of the other's current signal strength.

In step 850, a forecast relating to a future signal strength may be sent from a cellular signal strength system module and received at one or both of the handheld devices. For example, the first handheld device may be traveling along a certain path known to have certain variations in signal strength. At a certain point prior to signal strength dropping to a certain threshold, a notification and/or forecast may be generated by the signal strength module and sent to the device as it nears the region of low signal strength. In some embodiments, the forecast may further include a suggestion or recommendation on how to manage or maintain signal strength. The user may maintain or terminate the call, as well as pause or change paths. The forecast may further indicate the predicted or expected signal strength at a location towards which the user may be advancing. Such information may allow or assist the user with the decision on how to address the predicted reduction of signal strength.

In step 860, the user of the first electronic device may be allowed to select a manu of suggested or recommended actions. In certain instances, user may typically select from a list of suggestions that may include hanging up, pausing along the current path, taking alternate path, telling the other user(s) to call back or to expect low quality sound, or switching to Wi-Fi. In some embodiments, the other users with whom the first user may be speaking may also be presented with suggested or recommended actions in response to the predicted reduction in signal quality. Such actions may be the same or different from the set presented to the first user.

Figure 9:
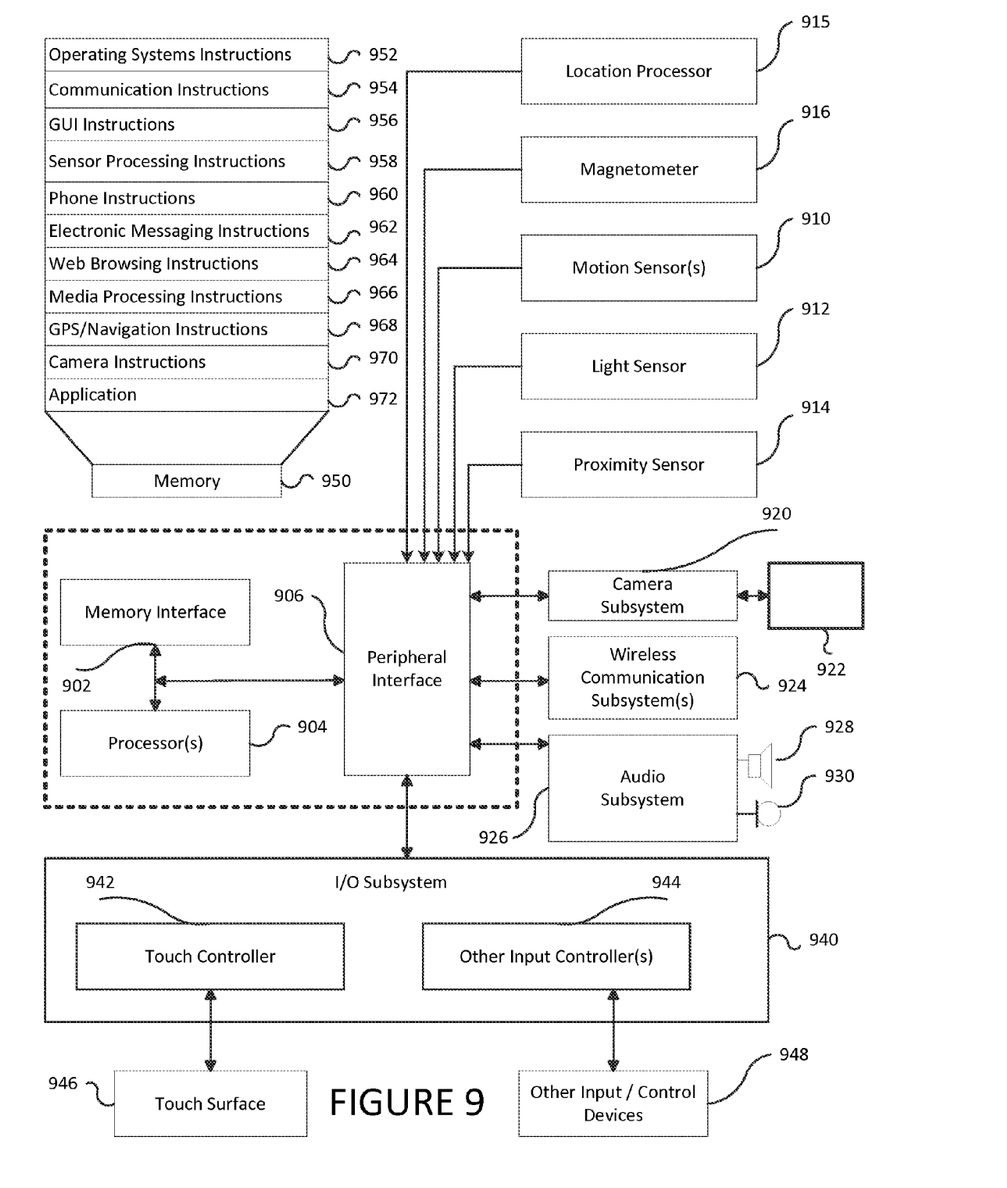
FIG. 9 illustrates a mobile device architecture that may be utilized to implement the various features and processes described herein.

FIG. 9 illustrates a mobile device architecture that may be utilized to implement the various features and processes described herein. Architecture 900 can be implemented in any number of portable devices including but not limited to smart phones, electronic tablets, and gaming devices. Architecture 900 as illustrated in FIG. 9 includes memory interface 902, processors 904, and peripheral interface 906. Memory interface 902, processors 904 and peripherals interface 906 can be separate components or can be integrated as a part of one or more integrated circuits. The various components can be coupled by one or more communication buses or signal lines.

Processors 904 as illustrated in FIG. 9 are meant to be inclusive of data processors, image processors, central processing unit, or any variety of multi-core processing devices. Any variety of sensors, external devices, and external subsystems can be coupled to peripherals interface 906 to facilitate any number of functionalities within the architecture 900 of the exemplar mobile device. For example, motion sensor 910, light sensor 912, and proximity sensor 914 can be coupled to peripherals interface 906 to facilitate orientation, lighting, and proximity functions of the mobile device. For example, light sensor 912 could be utilized to facilitate adjusting the brightness of touch surface 946. Motion sensor 910, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 906, such as a temperature sensor, a biometric sensor, or other sensing device to facilitate corresponding functionalities. Location processor 915 (e.g., a global positioning transceiver) can be coupled to peripherals interface 906 to allow for generation of geo-location data thereby facilitating geo-positioning. An electronic magnetometer 916 such as an integrated circuit chip could in turn be connected to peripherals interface 906 to provide data related to the direction of true magnetic North whereby the mobile device could enjoy compass or directional functionality. Camera subsystem 920 and an optical sensor 922 such as a charged coupled device (CCD) or a complementary metal-oxide semiconductor (CMOS) optical sensor can facilitate camera functions such as recording photographs and video clips.

Communication functionality can be facilitated through one or more communication subsystems 924, which may include one or more wireless communication subsystems. Wireless communication subsystems 924 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 924 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 924 may include hosting protocols such that the device may be configured as a base station for other wireless devices. Communication subsystems can also allow the device to synchronize with a host device using one or more protocols such as TCP/IP, HTTP, or UDP.

Audio subsystem 926 can be coupled to a speaker 928 and one or more microphones 930 to facilitate voice-enabled functions. These functions might include voice recognition, voice replication, or digital recording. Audio subsystem 926 in conjunction may also encompass traditional telephony functions.

I/O subsystem 940 may include touch controller 942 and/or other input controller(s) 944. Touch controller 942 can be coupled to a touch surface 946. Touch surface 946 and touch controller 942 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 946 may likewise be utilized. In one implementation, touch surface 946 can display virtual or soft buttons and a virtual keyboard, which can be used as an input/output device by the user.

Other input controllers 944 can be coupled to other input/control devices 948 such as one or more buttons, rocker switches, thumb-wheels, infrared ports, USB ports, and/or a pointer device such as a stylus. The one or more buttons (not shown) can include an up/down button for volume control of speaker 928 and/or microphone 930. In some implementations, device 900 can include the functionality of an audio and/or video playback or recording device and may include a pin connector for tethering to other devices.

Memory interface 902 can be coupled to memory 950. Memory 950 can include high-speed random access memory or non-volatile memory such as magnetic disk storage devices, optical storage devices, or flash memory. Memory 950 can store operating system 952, such as Darwin, RTXC, LINUX, UNIX, OS X, ANDROID, WINDOWS, or an embedded operating system such as VXWorks. Operating system 952 may include instructions for handling basic system services and for performing hardware dependent tasks. In some implementations, operating system 952 can include a kernel.

Memory 950 may also store communication instructions 954 to facilitate communicating with other mobile computing devices or servers. Communication instructions 954 can also be used to select an operational mode or communication medium for use by the device based on a geographic location, which could be obtained by the GPS/Navigation instructions 968. Memory 950 may include graphical user interface instructions 956 to facilitate graphic user interface processing such as the generation of an interface; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes, camera instructions 970 to facilitate camera-related processes and functions; and instructions 972 for any other application that may be operating on or in conjunction with the mobile computing device. Memory 950 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 950 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer may employ to access functions supporting the API. In some implementations, an API call can report to an application the capabilities of a device running the application, such as input capability, output capability, processing capability, power capability, and communications capability.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

Communication networks or links allow for communication between the user device, cloud social media system, and third party developers via various communication paths or channels. Such paths or channels may include any type of data communication link known in the art, including TCP/IP connections and Internet connections via cellular, Wi-Fi, Bluetooth, UMTS, etc. In that regard, communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network allows for communication between any of the various components of network environment.

The cellular signal strength system module may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for signal strength management, the method comprising:
    receiving information from a first electronic communication device, wherein the received information includes one or more settings that identify at least one action to be performed after a forecast that signal strength received by the first electronic communication device will likely be reduced in the future;
    receiving a measure of signal strength from the first electronic communication device, wherein the measure of signal strength includes a current measured signal strength measured by the first electronic communication device;
    sharing the measure of signal strength with a plurality of other devices allowed to receive signal strength information from the first electronic communication device, wherein the first electronic device receives one or more measures of signal strength from the other devices;
    identifying a current location of the first electronic communication device;
    identifying a velocity of the first electronic communication device, wherein the identified velocity is greater than zero;
    identifying a path of travel along which the first electronic communication device is traveling;
    accessing a database, wherein the database associates a signal strength with a plurality of different locations, and wherein the database is updated with signal strength data from a plurality of electronic communication devices located in the different locations;
    forecasting that the signal strength received by the first electronic communication device will likely be reduced in the future, wherein the reduced signal strength is forecasted based on the current location, the velocity, the path of travel, and the database associating signal strength with locations; and
    performing the at least one action after the forecast that the signal strength of the first electronic communication device will likely be reduced in the future according to the one or more settings received from the first electronic communication device, wherein the at least one action includes sending an alert to the third party indicating that the signal strength received by the first electronic device will likely reduce in the future, the alert specifying one or more recommendations for responding to the forecast of likely reduction in signal strength.

2. The method of claim 1, wherein the forecast includes a recommendation to complete a currently active call before a measure of time.

3. The method of claim 2, wherein the measure of time corresponds to a time of the forecasted future reduction of signal strength.

4. The method of claim 2, wherein the recommendation includes a change in the path of travel predicted to maintain a signal strength that is greater than the forecasted signal strength.

5. The method of claim 2, wherein the recommendation includes a switch from a cellular network to a Wi-Fi network.

6. The method of claim 1, wherein updating the database comprises:
    receiving an update regarding signal strength data from one of a plurality of electronic communication devices located in the different locations;
    identifying a location of the electronic communication device that sent the received and updated signal strength data; and
    storing the updated signal strength in association with the identified location.

7. The method of claim 1, wherein the location is identified by receiving GPS data from the first electronic communication device.

8. The method of claim 1, wherein the first communication device is on a call with a second communication device, and wherein the first communication device transmits the measure of signal strength to the second communication device.

9. The method of claim 8, wherein the first communication device receives a measure of signal strength measured by the second communication device.

10. The method of claim 8, wherein the first communication device displays the measure of signal strength measured by the second communication device.

11. The method of claim 10, wherein the display further includes the measure of signal strength currently measured by the first communication device and an indication of Wi-Fi service.

12. The method of claim 10, wherein the display includes the measure of signal strength as measured by the second communication device.

13. The method of claim 1, further comprising storing in memory the measure of signal strength measured by the first communication device and the identified location of the first communication device.

14. The method of claim 1, wherein the first communication device receives a selection through a user interface that enables the sharing of the measure of signal strength received by the first electronic communication device with another electronic communication device.

15. The method of claim 14, wherein the selection indicates that the sharing is to occur automatically.

16. The method of claim 1, wherein the at least one action includes mapping one or more alternate routes, each alternate route associated with a level of signal quality based on previously stored signal strength information regarding locations along the respective alternate route.

17. The method of claim 16, further comprising selecting one of the alternative routes to recommend based on maintaining a predetermined minimum level of signal quality when the current route level of signal quality falls below the predetermined minimum level of signal quality.

18. The method of claim 1, further comprising assembling a map of signal strength based on a plurality of measures of signal strength, each measure of signal strength measured by a different electronic device at a respective location at a respective time, the respective time falling within a predetermined amount of recent time.

19. An apparatus for signal strength management, the apparatus comprising:
one or more communication interfaces that:
receive information from a first electronic communication device, wherein the received information received includes one or more settings that identify at least one action to be performed after a forecast that signal strength received by the first electronic communication device will likely be reduced in the future;
receive a measure of signal strength over a communication network from a first electronic communication device, wherein the measure of signal strength includes a current measured signal strength received by the first electronic communication device; and
share the measure of signal strength with a plurality of other devices allowed to receive signal strength information from the first electronic communication device, wherein the first electronic device receives one or more measures of signal strength from the other devices;
a memory that stores a database, wherein the database associates a signal strength with a plurality of different locations, and the database is updated with signal strength data from a plurality of electronic communication devices located in the different locations; and
a processor that executes stored instructions, wherein execution of the instructions by the processor:
identifies a current location of the first electronic communication device;
identifies a velocity of the first electronic communication device, wherein the identified velocity is greater than zero;
identifies a path of travel along which the first electronic communication device is traveling;
forecasts that the signal strength received by the first electronic communication device will likely be reduced in the future, the reduced signal strength is forecasted based on the current location, the velocity, the path of travel, and the database associating signal strength with locations; and
performs the at least one action after the forecast that the signal strength of the first electronic communication device will likely be reduced in the future according to the one or more settings set at the first electronic communication device, wherein the at least one action includes sending an alert to the third party indicating that the signal strength received by the first electronic device will likely reduce in the future, the alert specifying one or more recommendations for responding to the forecast of likely reduction in signal strength.

20. A non-transitory computer-readable storage medium, having embodied thereon a program executable by a processor to perform a method for signal strength management, the method comprising:
receiving information from a first electronic communication device, wherein the received information includes one or more settings that identify at least one action to be performed after a forecast that signal strength received by the first electronic communication device will likely be reduced in the future;
receiving a measure of signal strength from the first electronic communication device, wherein the measure of signal strength includes a current measured signal strength received by the first electronic communication device;
sharing the measure of signal strength with a plurality of other devices allowed to receive signal strength information from the first electronic communication device, wherein the first electronic device receives one or more measures of signal strength from the other devices;
identifying a current location of the first electronic communication device;
identifying a velocity of the first electronic communication device, wherein the identified velocity is greater than zero;
identifying a path of travel along which the first electronic communication device is traveling;
accessing a database, wherein the database associates a signal strength with a plurality of different locations, and wherein the database is updated with signal strength data from a plurality of electronic communication devices located in the different locations;
forecasting that the signal strength received by the first electronic communication device will likely be reduced in the future, wherein the reduced signal strength is forecasted based on the current location, the velocity, the path of travel, and the database associating signal strength with locations; and
performing the at least one action after the forecast that the signal strength of the first electronic communication device will likely reduce in the future according to the one or more settings set at the first electronic communication device, wherein the at least one action includes sending an alert to the third party indicating that the signal strength received by the first electronic device will likely reduce in the future, the alert specifying one or more recommendations for responding to the forecast of likely reduction in signal strength.

* * * * *